Aug. 9, 1966    E. PIEPER ETAL    3,265,056
CUTTING OF STONE BLOCKS INTO SLABS BY VERTICAL GANG SAWS
Filed Aug. 20, 1963    3 Sheets-Sheet 1

INVENTOR.
Eberhard Pieper
Wilfried Weber
BY
Howard G. Russell
their ATTORNEY

Aug. 9, 1966   E. PIEPER ETAL   3,265,056
CUTTING OF STONE BLOCKS INTO SLABS BY VERTICAL GANG SAWS
Filed Aug. 20, 1963   3 Sheets-Sheet 2

INVENTOR.
Eberhard Pieper
Wilfried Weber
BY
Howard G. Russell
their ATTORNEY

Aug. 9, 1966     E. PIEPER ETAL     3,265,056
CUTTING OF STONE BLOCKS INTO SLABS BY VERTICAL GANG SAWS
Filed Aug. 20, 1963     3 Sheets-Sheet 3

INVENTOR.
Eberhard Pieper
Wilfried Weber
BY
Howard G. Russell
their ATTORNEY

United States Patent Office 3,265,056
Patented August 9, 1966

3,265,056
CUTTING OF STONE BLOCKS INTO SLABS BY VERTICAL GANG SAWS
Eberhard Pieper and Wilfried Weber, Altotting, Bavaria, Germany, assignors to Machinenfabrik Esterer A.G., Bavaria, Germany, a corporation of Germany
Filed Aug. 20, 1963, Ser. No. 303,250
Claims priority, application Germany, May 10, 1963, M 56,773
10 Claims. (Cl. 125—16)

This invention relates to the art of cutting stone blocks into slabs by multibladed saws and has particular application to gang saws, and to the use of gang saws, in which the saw blade frame is reciprocated in a substantially vertical plane.

Gang saws are known in which the stone block rests on a horizontal carriage or support provided with longitudinal slots for the blades. The carriage is advanced toward the blades by appropriate power means.

This arrangement is very satisfactory for the cutting of slabs of appreciable thickness and in a production procedure in which the thickness of the slabs is rarely changed. However, the cutting of relatively thin slabs would require the use of a carriage with correspondingly closely spaced slots. The solid portion of the carriage between adjacent blades must of necessity be narrower than the thickness of the slabs to be cut, making allowances for clearance of the blades in the slots. The long and narrow solid portions of the carriage therefore lack sufficient rigidity and strength. This problem becomes greater the thinner the slabs to be cut.

If the thickness of the slabs is to be changed, except in the case of doubling or tripling the thickness, the carriage or support must be exchanged for one of appropriate slot spacing, which is an awkward and time consuming procedure.

The invention provides improvements leading to a rigid support of great strength for the stone blocks irrespective of the thickness or thinness of the slabs to be cut and permitting quick changeover from one slab thickness to another.

According to the improved arrangement the stone block is boxed in a work frame and clamped therein by appropriate means. The stone block rests on a solid immovable work table and is advanced towards the blades by an appropriate feeding mechanism. As the undersurface of the block is likely to be irregular, it is advantageously placed on supporting slats, preferably transversely disposed, and composed of a readily sawable material, such as wood, plastic or a composition material. Irregularities between the undersurface of the stone block and the top surface of the supporting slats may be taken up by an initially plastic, subsequently hardenable material, such as plaster of Paris. This insures that the block rests securely on the work table without danger of wobbling.

Spaces between the work frame proper, its clamping or chucking elements on one hand and the stone block on the other may be taken up or bridged by blocks or spacers of a readily sawable material, so that the danger of cutting into the frame proper or its clamping elements is avoided. This applies also to the trailing transverse member of the work frame which pushes the stone block along and is preferably spaced from the stone block by spacer blocks of sufficient thickness that the blades may cut into the blocks when completing the sawing of the block without danger of contact between frame or blades.

The coefficient of friction between the slats and the work table may be reduced by applying an appropriate lubricant, or by surfacing the underside of the slats with an inherently slippery material.

The various features and advantages of this invention will appear more fully from the detailed description which follows accompanied by drawings showing, for the purpose of illustration, a preferred embodiment of the invention. The invention also resides in certain new and original features of construction and combination of elements, as well as sequence of steps as hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it, in which:

Figure 1:
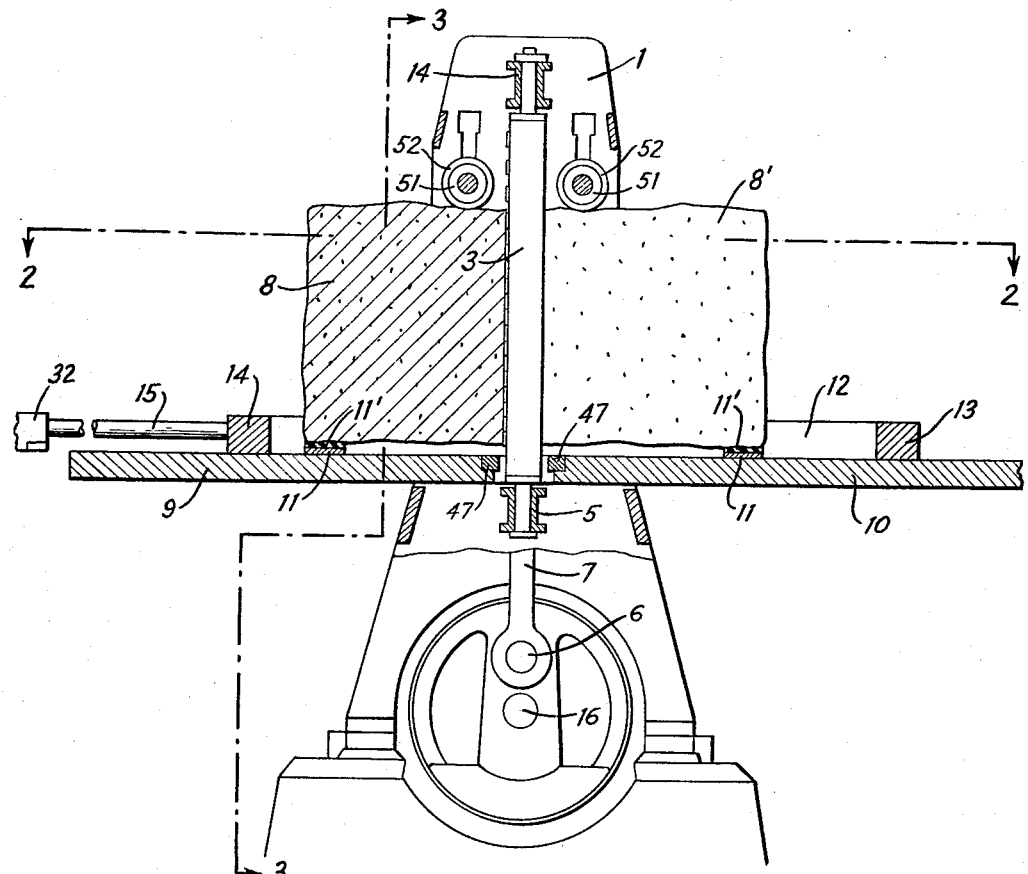
FIG. 1 is an elevation, partly in section, of a gang saw embodying the invention, the section being taken on line 1—1 of FIG. 3.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it should be understood that structural details may be modified in various respects without departure from the principles of the invention and that the invention may be incorporated in, and practiced by, other structural forms than shown.

The gang saw comprises a main frame or base 1 in which a saw frame 2 is mounted with freedom of reciprocating movement in a substantially vertical plane. Blades 3, which may be toothless, are mounted with tension between an upper transverse member 4 and a lower transverse member 5 of the saw frame 2.

A drive shaft 16, to the ends of which cranks 6 are secured, reciprocates the saw frame 2 by means of connecting rods 7 pivotally engaging the cranks 6 and studs 17 (FIG. 3) on the saw frame 2, respectively. The drive shaft 16 has a fixed drive pulley 18 on it and an idler pulley 19. The drive pulley 18 drives the shaft 16 by a suitable belt (not shown). The cranks 6 may be constructed as counterbalanced fly wheels.

A stone block 8 to be cut into slabs 8' rests on a horizontal work table comprising a front portion 9 and a rear portion 10. The work table preferably consists of hardened steel and has a plane horizontal, preferably unbroken surface on which the stone block 8 is supported.

Stone blocks generally have an uneven bottom surface which, if placed directly on the work table, may lead to locally high contact pressure, chipping of the block, and undue frictional resistance. For this reason it is preferred to rest the block on transverse supporting slats 11 of a readily sawable material. Wood is suitable for this purpose as is composition material such as hardboard and the like.

The undersurface of the slats may be coated with a slippery sheet material such as tetrafluoroethylene polymer plastic known to the trade as "Teflon" and available in the form of self-adhering tape. Conventional lubricants such as water-resistant greases may also be employed.

During the sawing process the saw blades cut easily through the transverse supporting slats without lessening their ability to support the slabs thus cut.

As the underside of the stone block is likely to be irregular, it is preferred to fill any spaces between the supporting slats and the stone block by an originally plastic material which hardens after application. Plaster of Paris serves this purpose well as it does not interfere with the sawing of the stone block. The filler material 11' is placed on the slats and the block on the filler material. When the material hardens the mounted block is ready for sawing.

Figure 2:
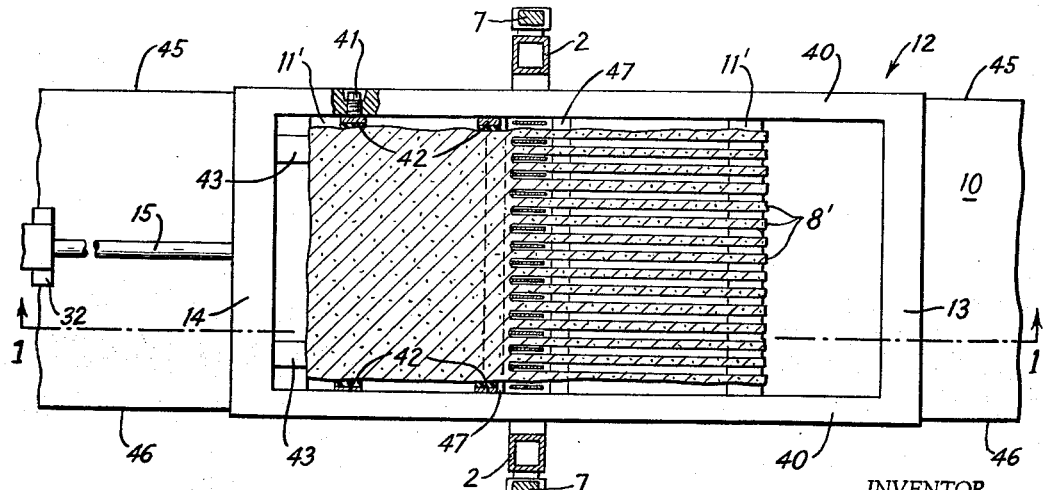
FIG. 2 is a plan view, partially in section, the section being taken on line 2—2 of FIG. 1.

The stone block 8 is boxed within a work frame 12 comprising a leading transverse portion 13, a trailing transverse portion 14 and lateral portions 40 connecting the leading and trailing transverse portions. The work frame 12 is movable back and forth with respect to the table by means of a suitable power feed mechanism. In FIGS. 1 and 2 a piston rod 15 of a servo-motor later to be described is shown for this purpose.

The work frame is fitted with chucking or clamping devices for holding the stone block 8 immovable with respect to the work frame. These chucking or clamping devices may be of a screw type and are shown at 41 in FIG. 2. The clamping devices may engage the stone block directly, but it is preferred to interpose blocks of readily sawable material, such as wood, between the metal part of the clamping devices and the stone block proper so as to avoid the danger of a clamping device being accidentally hit by a saw blade. Blocks of readily sawable material are shown at 42 between the clamping devices and the stone block. Similar blocks 43 are inserted between the trailing transverse frame member of the work frame and the stone block. The blocks 43 permit the blades to pass entirely through the stone block without danger of cutting into the trailing transverse frame member 14.

Figure 3:
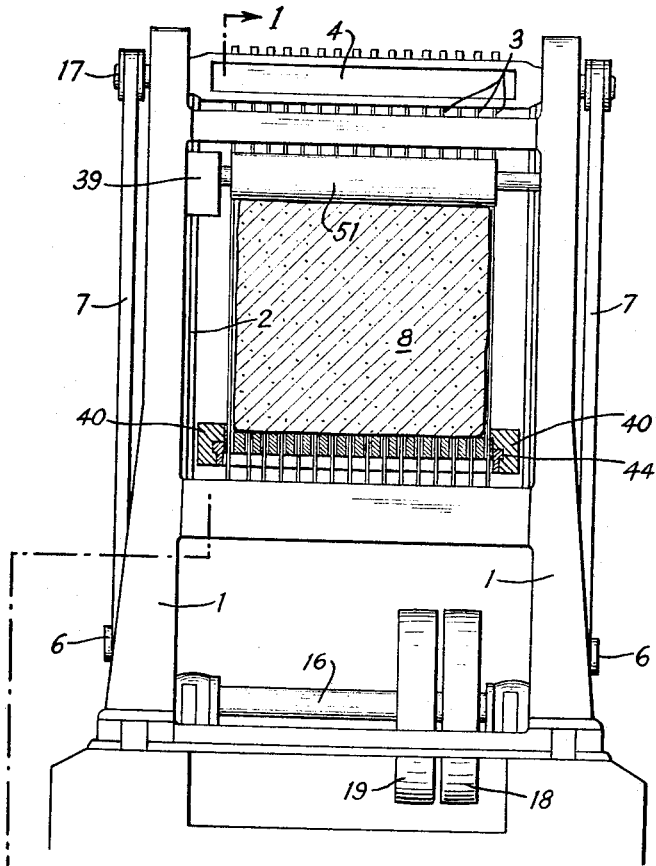
FIG. 3 is an elevational view, partly in section, the section being taken on line 3—3 of FIG. 1.
Figure 4:
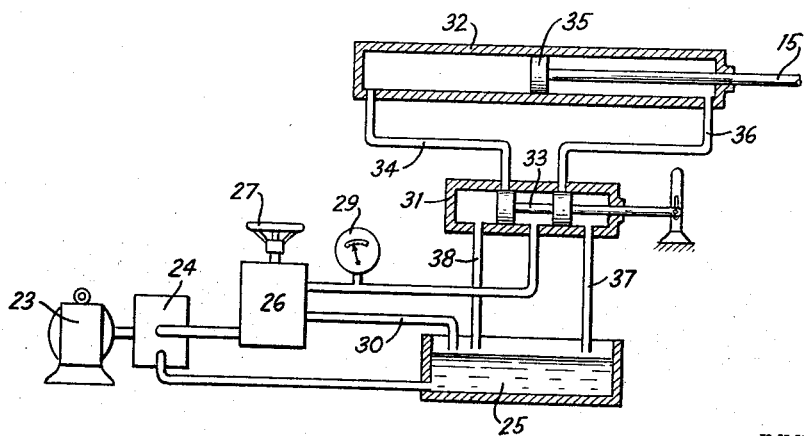
FIG. 4 is a diagrammatic illustration of the hydraulic mechanism for controlling the advance of the work frame towards the saw blades.

As seen in FIGS. 2 and 3 the lateral portions 40 of the work frame preferably extend between the saw frame 2 and the saw blades 3. The lateral portions of the work frame have depending flanges 44 which engage the lateral edges 45, 46 (FIG. 2) of the work table 9, 10 for accurate straight line guidance of the work frame and of the stone block clamped therein. Accurate guidance is of importance in preventing the formation of saw mark grooves or other irregularities on the faces of the cut stone slabs which would require additional grinding operations in order to remove them.

Figure 5:
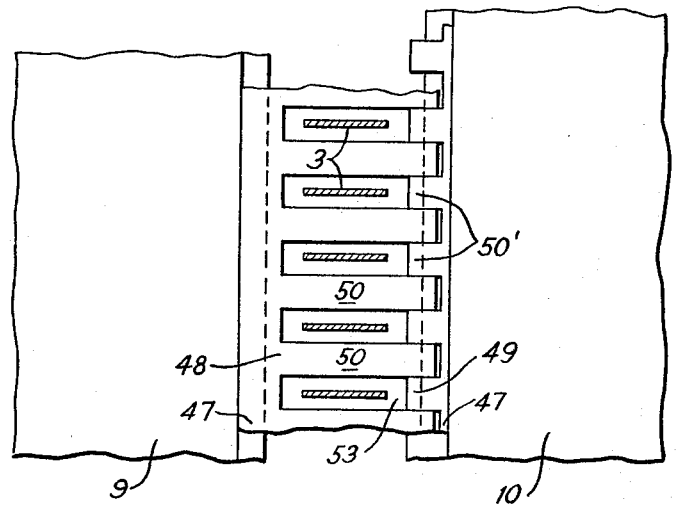
FIG. 5 is a plan view of a bridging element of the gang saw.

The space between the front and rear portions 9, 10 of the work table is bridged by an appropriate bridging insert 47 presenting a top surface which is flush with the surface of the work table. Preferably the bridging insert comprises two tined pieces which interlock so as to provide continuous support for the supporting slats 11 sliding thereover. A preferred form of bridging insert is shown in FIG. 5 and comprises two components 48, 49, each provided with tines 50, 50'. The spaces 53 between the tines are sufficient to provide clearance for the blades 3 both during the period of installation and the period of sawing.

Figure 6:
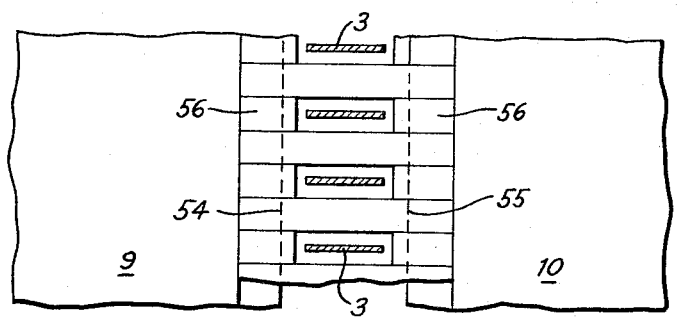
FIG. 6 is a plan view of a modified form of bridging element.

A modified form of bridging means is shown in FIG. 6 and comprises individual tines or bars 150 placed on shoulders 54, 55 on the tables 9, 10 and spaced by spacer blocks 56. The bars 150 and the spacer blocks are exchangeable for others of a different width.

The stability of the stone block may further be improved by adjustable pressure rollers 51 mounted above the work table on the main frame, preferably in a position close to the saw frame 2. The rollers may be provided with a peripheral layer 52 of compressible material, such as rubber, to compensate for irregularities in the contour of the top surface of the stone block. The pressure rollers are preferably power driven by a variable speed drive mechanism 39 which may be of the constant torque type.

Preferably the work frame is advanced towards the saw blades by a power mechanism providing a continuous range of feed rates.

A representative form of hydraulic mechanism for this purpose is shown in FIG. 3.

An electric motor 23 drives a pump 24 withdrawing hydraulic liquid from a pool 25 and feeding it towards a pressure regulator 26 which may be adjusted by a hand wheel 27 to maintain a constant hydraulic pressure in an output line 28 provided with a pressure gauge 29. Excess liquid is returned by the regulator to the pool 25 through a line 30.

A sleeve type valve 31 controls the flow of liquid under pressure to a hydraulic servomotor 32 which then moves the stone block through rod 15.

In the position illustrated in FIG. 3 the flow of pressure liquid to the servo-motor is shut off. If the valve member 33 is moved to the left, liquid flows from line 28 through line 34 into the left chamber of the servomotor driving its piston 35 to the right. Liquid from the right cylinder chamber returns through a line 36 to the valve 31 and thence to the pool 25 through a drain line 37.

If the position of the valve member 33 is reversed to retract the work frame 12 after completion of a cut, the pressure liquid flows from the valve 31 through line 36 into the right cylinder chamber while the left chamber is being drained through line 34 and a further drain line 38.

The hydraulic drive permits presetting and maintenance of any desired feed force with great accuracy.

What is claimed is:

1. In the art of cutting a stone block into slabs by a multibladed upright gang saw, the method of placing supporting slats of an easily sawable material on a substantially horizontal plane stationary supporting surface on which supporting surface said slats rest supported by said surface along substantially the entire undersurface of the slats; placing the block on said slats and filling the spaces between the top surface of the slats and the undersurface of the block by a plastic hardenable filler material; and, after hardening of said material, sliding said block on its slats on said supporting surface towards, and into cutting engagement with, the blades of the saw.

2. In the art of cutting a stone block into slabs by a gang saw whose multibladed saw frame is reciprocated in a substantially vertical plane, and which comprises a horizontal plane stationary work supporting table in front of, and behind, the saw blades providing within its lateral dimension a continuous unbroken supporting table surface for at least the width of the gang saw, the steps of placing slats of a readily sawable material on said work table, said slats having a flat undersurface resting in contact with said table surface along substantially all of the undersurface area; placing a plastic hardenable material on said slats; placing the stone block to be cut on said slats and plastic material; and, after hardening of said plastic material, sliding said block, slats and hardened material on said table surface towards, and into cutting engagement with, the blades of the saw.

3. In the art of cutting a stone block into slabs by a gang saw whose multibladed saw frame is reciprocated in a substantially vertical plane, and which comprises a horizontal plane stationary work supporting table in front of, and behind, the saw blades providing within its lateral dimension a continuous unbroken supporting table surface for at least the width of said gang saw, the steps of placing slats of a readily sawable material on said work table, said slats having a flat undersurface resting in contact with said table surface along substantially all of the undersurface area; placing a plastic hardenable material on said slats; placing the stone block to be cut on said slats over said plastic material; after hardening of said plastic material, sliding said block, slats and hardened material on said table surface towards, and into cutting engagement with, the blades of the saw; and cutting through said slats and hardened material as the cutting of said block into slabs progresses.

4. The method defined in claim 3 in which, in addition, a lubricant is provided between said table and said slats.

5. A device for cutting a stone block into slabs, the device comprising, in combination, a saw frame mounted for reciprocating motion in a substantially vertical plane; a group of parallel vertical blades in said saw frame; means for vertically reciprocating said saw frame; a stationary work table in front of, and behind, the saw frame, said table having a horizontal plane table surface which is continuous in a lateral direction for at least the width of said group of blades; a pair of transverse slats for supporting the ends of the block, said slats being of a readily sawable material and having a flat undersurface resting in contact with, and slidable on, said table surface for at least the width of said group of blades; a horizontal work frame on said table, said work frame comprising a leading transverse frame member behind said blades, a trailing frame member in front of said blades, and lateral frame members connecting said transverse members and extending outside of said blades; means on said work frame for clamping a stone block resting on said slats within said work frame; and work feeding means for moving said work frame relatively to said blades in a direction in which said trailing transverse member moves toward said blades.

6. A device as defined in claim 5 in which there are provided guide means on said work frame and said table for guiding said frame for lengthwise movement relatively to said table.

7. A device as defined in claim 5 in which there are provided spacer blocks of a readily sawable material between the stone block and at least those clamping means on the work frame which act on the trailing surface of the block.

8. A device as defined in claim 5 in which the lateral frame members extend between the saw frame and the group of blades.

9. A device for cutting a stone block into slabs, the device comprising, in combination, a saw frame mounted for reciprocating motion in a substantially vertical plane; a group of parallel vertical blades in said saw frame; means for vertically reciprocating said saw frame; a first stationary work table in front of the saw frame; a second stationary work table in back of the saw frame, the surfaces of said tables being flat and lying in the same horizontal plane, the surfaces of said tables being continuous in a lateral direction for at least the width of said group of blades; a transverse slat on each of said work tables for supporting the ends of the block, said slats being of a readily sawable material and having a flat undersurface resting in contact with, and slidable on, the respective table surface for at least the width of said group of blades, said tables being spaced from each other leaving a gap through which said blades extend; tined bridging means in said gap between said tables; said bridging means forming an upper supporting surface lying in the same plane as the table surfaces, said upper supporting surface extending between said blades; a horizontal work frame, said work frame comprising a leading transverse frame member above said second table, a trailing transverse frame member above said first table, and lateral frame members connecting said transverse members and extending across said gap; means on said work frame for clamping within said work frame a stone block resting on said slats; and work feeding means for moving said work frame relatively to said blades in a direction in which said trailing transverse member moves toward said blades.

10. A device as defined in claim 9 in which a plastic hardenable filler material is placed between the upper surface of said slats and the lower surface of said block.

References Cited by the Examiner

UNITED STATES PATENTS

| 37,335 | 1/1863 | Cushing | 143—84 |
| 386,147 | 7/1888 | Manley | 143—32 |
| 958,684 | 5/1910 | Witt | 125—16 |
| 1,637,138 | 7/1927 | Chase | 51—283 |
| 1,674,519 | 6/1928 | Patterson | 125—16 |
| 2,615,483 | 10/1952 | King | 144—247 |
| 2,896,605 | 7/1959 | Thompson | 125—16 |
| 2,951,475 | 9/1960 | Leo | 125—16 |
| 3,148,673 | 9/1964 | Ronzani | 125—13 |

FOREIGN PATENTS 9,858    8/1843    Great Britain.

HAROLD D. WHITEHEAD, *Primary Examiner.*